United States Patent Office 3,437,785
Patented Apr. 8, 1969

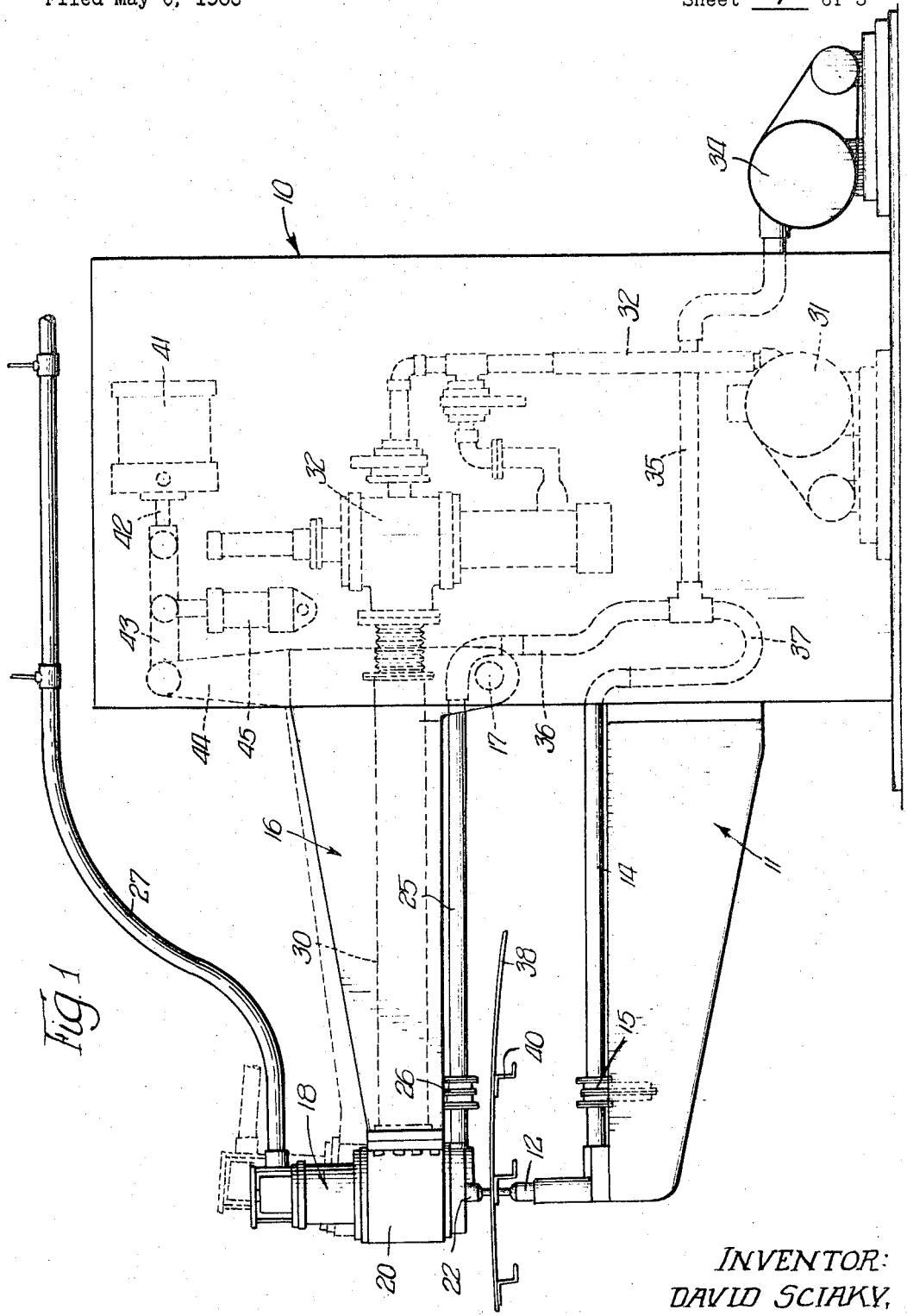

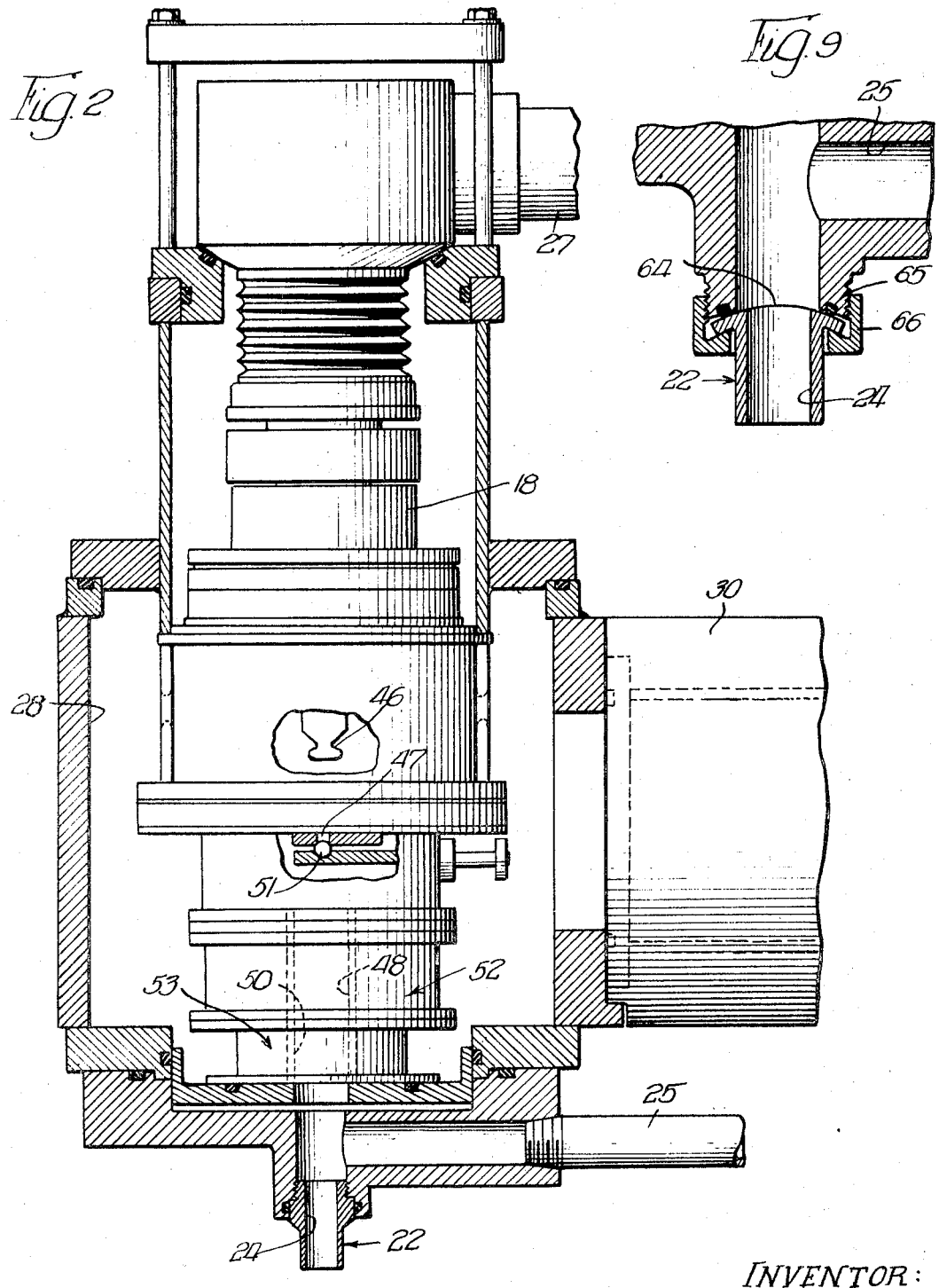

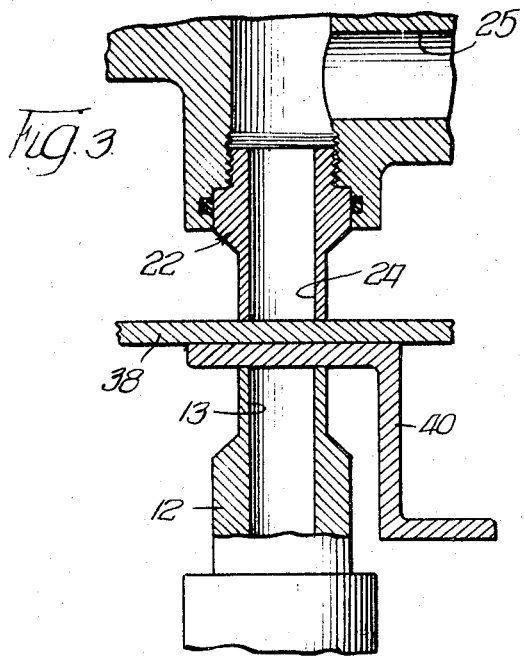
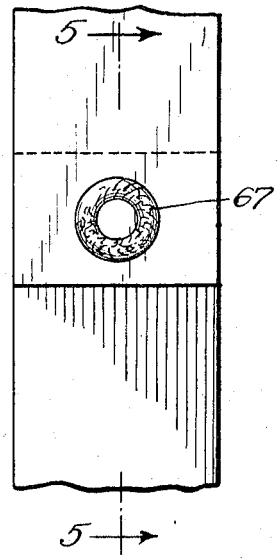
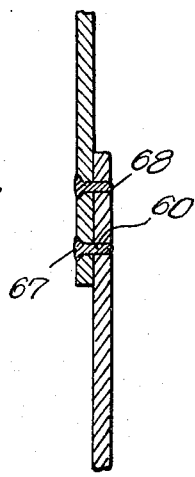
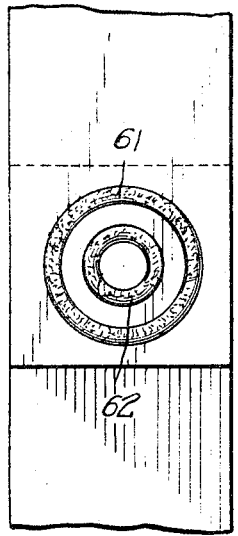
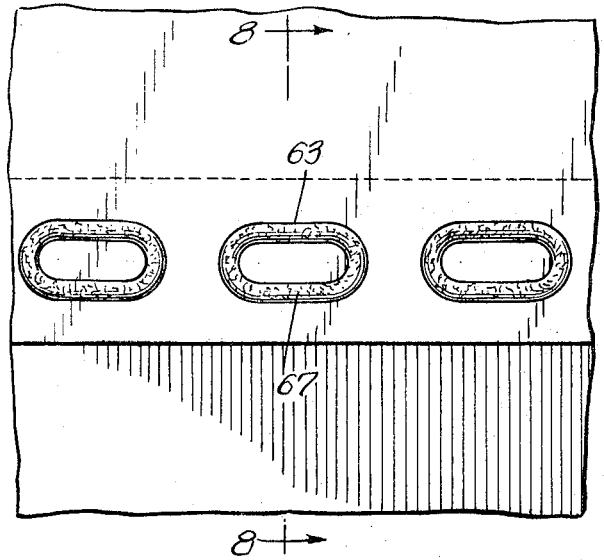
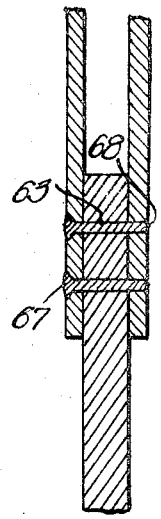

3,437,785
METHOD FOR ELECTRON BEAM WELDING
OF OVERLAPPED SHEETS
David Sciaky, Chicago, Ill., assignor to Welding Research,
Inc., Chicago, Ill., a corporation of Illinois
Filed May 6, 1966, Ser. No. 548,199
Int. Cl. B23k 9/08, 37/02, 11/10
U.S. Cl. 219—121                                    7 Claims

ABSTRACT OF THE DISCLOSURE

A method of spot welding overlapped sheets by an electron beam apparatus is disclosed. The electron beam apparatus includes an upper and lower arm member for clamping the overlapped sheets between opposed tubular dies so that each die has surrounding relation with the area to be welded. Sufficient pressure is then applied to the dies such that an annular seal is formed at the dies and at the mating surfaces of the overlapped sheets. The dies are then evacuated and an electron gun is energized to spot weld the respective sheets.

---

The invention relates to electron beam welding and has reference in particular to a new and novel method and apparatus for the electron beam welding of metallic parts of relatively large dimensions and wherein only that area of the part surrounding the spot to be welded is maintained in a rarified atmosphere.

In the early methods heretofore employed in welding metallic parts by an electron beam, the parts were enclosed in a chamber in which a high vacuum was maintained in the order of $10^{-4}$ torr. For welding workpieces of large dimensions, a large chamber capable of completely enclosing the workpieces was thus required. The pumping equipment for such large chambers was expensive and the pumping operations for maintaining the high vacuum were also very costly.

More recently the parts to be welded have been maintained in a medium vacuum of approximately $10^{-1}$ torr in order to reduce the costs of the pumping equipment and its operation. However, for successful electron beam welding it is required that the electron gun be operated in a high vacuum of about $10^{-4}$ torr, and accordingly a separate chamber was provided for the gun notwithstanding the fact that this separate chamber required its own pumping system. The two chambers were so arranged that the electron beam was projected from the high vacuum chamber through an orifice into the medium vacuum chamber where it performed the welding operations on the workpieces.

Other solutions have been attemped for the electron beam welding of large workpieces such as would eliminate the large chambers with their attendant expensive pumping equipment and high operating costs. According to these later methods, limited areas of the workpieces are placed in a localized vacuum and then welded. Although these methods have been successful on workpieces of certain shapes, they are too slow and expensive for most welding operations due to the local sealing operations required for each welding step. For metallic parts consisting of overlapping sheets and panels such methods have proven to be impractical, and for this reason assemblies of overlapping sheets and plates have been joined by resistance spot welding. However, spot welds produced by resistance welding do not have the high strength and improved fatigue endurance which characterizes the spot welds produced by the electron beam.

The main difficulty encountered in the electron beam welding of overlapping workpieces is due to the fact that a leak develops when the beam reaches the interface between the parts. The leak to the atmosphere breaks the vacuum and the effectiveness of the electron beam is impaired by the scattering of the electrons. A further difficulty resides in the fact that both sides of the workpiece have to be locally enclosed in a rarified atmosphere and this requires the use of at least two vacuum chambers, one for the electron beam gun and one for the workpiece. Also, when welding assemblies of varying curvature, as for example, an airplane wing, several pairs of chambers may be needed corresponding to the several areas of different curvature to be welded. These difficuties have severely limited the use of electron beam welding, particularly electron beam spot welding.

An object of the invention is to provide an electron beam welding method which will eliminate the difficulties previously discussed and make possible the joining of small as well as large assemblies of overlapping sheet and/or plates, and particularly sheet metal panels whose strength and rigidity is obtained by the use of spot welded stiffening members.

Another object is to provide an electron beam welding method for spot welding overlapping workpieces wherein the beam is caused to orbit or to move in a definite path during the welding operation so as to produce spot welds of circular shape consisting of a single ring or a double ring and also spot welds of an oblong or other shape best adapted to the various stress and fatigue requirements of the particular assembly.

Another object is to provide an electron beam welding method for spot welding overlapping workpieces wherein the curvature of the parts may vary widely for different assemblies, wherein the material to be welded may consist of those materials used in aircraft and in modern space vehicles as for example, high strength aluminum alloys, titanium alloys, stainless steel and the like, and wherein joints of high strength with improved fatigue endurance can be produced without distorting the assemblies which have to retain their well defined shape, although many spots welds may be applied thereto.

A further and more specific object of the invention is to provide electron beam welding apparatus which will essentially consist of a pair of opposed dies for pressing the overlapping sheets into contact with such force that an annular seal is obtained, each die being large enough to surround the area to be welded on its respective side of the workpiece, and wherein the dies are evacuated to maintain the desired vacuum within the dies at the sealed area.

A further objective of the invention is to provide a method of welding overlapping sheets at localized areas wherein the mating surfaces of the overlapping sheets may be more effectively sealed by the insertion between the sheets of a thin sheet of aluminum or other material which will alloy into the weld area and which will not impair the strength of the weld.

With these and various other objects in view the invention may consist of certain novel features of construction and operation, as will be more fully described and particularly pointed out in the specification, drawings and claims appended thereto.

In the drawings which illustrate an embodiment of the device and wherein like reference characters are used to designate like parts:

FIGURE 1 is a side elevational view showing an electron beam spot welding machine equipped with clamping dies and capable of performing the welding method of the invention;

FIGURE 2 is an elevational view, with parts in section, and showing the electron beam gun in combination with associated elements for performing the present method;

FIGURE 3 is a fragmentary detail view showing the clamping dies for clamping and sealing the overlapping workpieces;

FIGURE 4 is an elevational view showing a circular spot weld consisting of a single ring;

FIGURE 5 is a longitudinal sectional view taken substantially along line 5—5 of FIGURE 4;

FIGURE 6 is an elevational view showing a spot weld consisting of a double ring;

FIGURE 7 is an elevational view showing a number of spot welds having an oblong shape;

FIGURE 8 is a longitudinal sectional view taken along line 8—8 of FIGURE 7; and

FIGURE 9 is a fragmentary sectional view similar to FIGURE 3 but showing a modification wherein a spherical bearing arrangement is provided for the dies.

A complete welding machine equipped with an electron beam gun, clamping dies, and vacuum pumps is disclosed in FIGURE 1 and such a machine is capable of operation in accordance with the method of the present invention. The housing 10 is provided with a lower stationary arm 11 which terminates at its left hand end in a lower die 12. The said die is tubular as best shown in FIGURE 3, with the bore 13, which extends axially of the die 12, having connection with the conduit 14 for evacuating the die to thus produce a rarified atmosphere within the bore. A valve 15 which is electrically controlled as by means of a solenoid is located in the conduit 14. The upper movable arm 16 is pivotally mounted on the housing 10 at 17, and said arm at its free end carries the electron gun 18 and associated elements which will be described in detail in connection with FIGURE 2. The structure 20 may be considered as the member for fixedly mounting the gun and associated parts on the movable arm 16, with the upper die 22 depending below the mounting structure. The bore 24 extends axially through this die and said bore has connection with the conduit 25. The valve 26 which is interposed in the conduit 25 is electrically actuated in the same manner as valve 15. The cables for supplying the electrical energy to the electron gun pass through the flexible hose 27 and the chamber 28, FIGURE 2, in surrounding relation with the gun 18, is evacuated by means of the conduit 30 and connecting pumps, the conduit being suitably carried by and forming part of the movable arm 16.

It has been previously stated that the gun chamber must be maintained at a high vacuum for the most successful welding performance and this is accomplished by the special pumping equipment provided for this chamber and including the high vacuum pump 31 and pipes 32 connecting with conduit 30. Separate pumping equipment is provided for the dies 12 and 22, the same including the vacuum pump 34 having connection by means of the pipes 35, 36 and the flexible loop 37 with the conduit 14 for the lower die and with the conduit 25 for the upper movable die. The pump 34 will have sufficient capacity to maintain the interior of the dies at a medium vacuum during the welding operation.

The dies 12 and 22 as shown in FIGURE 1 have clamping engagement with a workpiece which may comprise the metal panel 38 and the metal stiffening members 40. In order to make possible the insertion of the overlapping metal parts between the clamping dies, the upper arm is pivotally mounted by the housing 10 and a power cylinder 41 is provided for effecting limited movement of the arm about the pivot 17. The piston rod 42 of said power cylinder is connected to the toggle link structure 43, which in turn is pivotally connected to arm 16 by means of the part 44. The arm 16 can thus be actuated to raise and lower the die 22 by operation of the power cylinder 41. When a greater degree of separation of the dies is required, the pivotal power cylinder 45 is actuated to break the levers of the toggle structure 43.

The electron gun with ball valve for sealing the gun chamber from the atmosphere between welding operations is shown in elevation in FIGURE 2. Said structure is fully disclosed and described in my copending application Ser. No. 399,221, filed Sept. 25, 1964 and entitled "Electron Beam Welding Apparatus," and reference is made to said application for a full understanding of this electron beam welding apparatus. It is sufficient for the present invention to understand that the electron gun produces a beam of electrons by means of the electron emitting element or filament 46, the beam being projected through the orifice 47, the passages 48 and 50 and finally through the bore 24 of the upper die 22 and into contact with the workpiece. Between the welding operations the ball valve 51 is made operative for closing the orifice 47, and thus the high vacuum gun chamber is sealed and pumping requirements are materially reduced for this high vacuum chamber.

The part 52, having the passage 48, provides electromagnetic means in the form of electric coils for controlling the electron beam and for properly focusing the beam on the workpiece. The part 53, having the passage 50, also consists of a plurality of electric coils and which provide electromagnetic means for orbiting the electron beam. A rotating magnetic field is produced by the various coils of said part 53 and this rotating magnetic field causes the electron beam to move in an orbital path. The orbital path can be controlled for the spot welding operations and as a result the overlapping workpieces can be spot welded by a single ring as shown in FIGURE 4 or by a double ring as shown in FIGURE 6. Other spot welds can be produced having the shape of an oblong as illustrated in FIGURE 7.

The electron beam spot welder of FIGURE 1 may be operated automatically, which merely requires that the operator close a foot switch and the machine performs its necessary functions in the proper sequence. It will be assumed that the power cylinder 41 has been actuated to oscillate the part 44 and thus the movable arm 16 in a clockwise direction, thus elevating the movable die 22 and permitting insertion of the workpiece 38 and 40. Since the dies 12 and 22 are thus opened to the atmosphere, the valves 15 and 26 have been previously closed and the ball valve 51 will also have been previously closed for sealing the orifice 47. By closing the orifice 47, the chamber surrounding and enclosing the electron emitting element 46 is maintained at a high vacuum and the pumping requirements for each welding operation are materially reduced. Also, by closing the valves 15 and 26 the space within the dies which has to be evacuated is reduced to a minimum.

With the workpiece having been inserted between the separated dies 12 and 22 the next step in the operation of the welder is to cause oscillating movement of the movable arm 16 in a down or counterclockwise direction and movement of the said arm in this direction is conveniently effected by actuation of the power cylinder 41 in the proper direction. The opposed dies are thus caused to clamp the overlapping parts of the workpiece between them. In accordance with the invention sufficient power is exerted by the cylinder 41 to cause the dies to press the overlapping parts of the workpiece together with sufficient pressure to effect a seal at the mating surface of the parts. Such a seal will be substantially annular and large enough to surround the area to be welded. For a spot weld of one half inch diameter the dies 12 and 22 may have an outside diameter of approximately three fourths inch and an inside diameter of approximately five eighths inch. The dies are formed of any suitable hard material and based on a pressure of fifty thousand pounds per square inch, a clamping force of six thousand six hundred pounds will produce an effective seal between the two sheets for dies of this size.

After the workpieces have been clamped between the dies, the valves 15 and 26 are opened and the ball valve 51 is withdrawn to open the orifice 47. The space within the dies is readily evacuated producing medium vacuum conditions in the area to be welded and which exists on both sides of the workpiece. The electron gun can now be energized to cause the projection of an electron beam for spot welding the workpieces. Simultaneously with or immediately before the projection of the electron beam the part 52 is energized for properly focusing the beam and the part 53 comprising a circuit or path generator is also energized to cause the beam to orbit and describe a circle, an oblong, or a spiral or to cause the beam to move along other paths or in a straight line as may be desired and which may be best suited for spot welding the particular materials of the workpiece.

FIGURE 9 shows a variation wherein a spherical bearing arrangement for the dies provides for a swivelling motion. The die 22 selected for illustration is provided with a convex upper surface 64 which is received by a concave surface formed in the part containing the passage 25. A sealing member 65 is retained by the said part and the die is held by the ring member 66. The die is thus capable of swivelling motion so as to insure a self-aligning of the die with the surface of the workpiece. Uniform distribution of the clamping force results and an effective sealing is obtained at the mating surfaces of the sheets to be welded.

FIGURES 4 and 5 show a spot weld in the shape of a ring 60. As regards such a weld the same may, for example, have an outside diameter of one half inch and an inside diameter of approximately five sixteenths of an inch. In such case the width of the welded zone would be three thirty seconds of an inch, and the total welded area would be about sixty percent of the area contained within the outside circumference of the weld. In the spot welding of the workpiece the beam will be adjusted so that it will melt the metal in depth and produce a circular melted zone of a height equal to the total thickness of the sheets to be welded. The circular seal around the welded area will prevent the access of air between the two parts of the workpiece. By preventing the access of air to the working zone of the beam a perfect weld can be obtained.

In cases where for metallurgical or other reasons a narrower weld is desirable, two concentric annular welds such as 61 and 62 can be made as shown in FIGURE 6. The outer weld 61 may have an outside diameter of one half inch and an inside diameter of three eighths of an inch. For the inner weld its diameter could approximate one fourth of an inch outside and one eighth of an inch inside. The two welds would each have a width of only one sixteenth of an inch and a space of one sixteenth of an inch between them. However, the total welded area would again be sixty percent of the area within the one half inch outside diameter.

For more effectively sealing the space between the two overlapping sheets, a thin sheet of aluminum or other material may be inserted therebetween. The material must be so selected that the small amount which will alloy into the weld area will not impair the strength of the weld. In those cases where no additional material is permitted in the weld area, a continuous ring of indium wire, or wire of any other suitable material and having a diameter large enough to encircle the weld area, may be placed between the two sheets to be welded. When pressure is applied to the sheets the soft wire will effectively seal the weld area so that when the beam passes through the sheets there will be no influx of air at the mating surfaces or into the gun.

When metal sheets are welded by resistance welding methods there is no way of positively determining whether the sheets have been satisfactorily joined together except by means of destructive tests. In practice the operator will take two sheets of test material called test coupons, and after welding, they are tested in a tensile testing machine, or the weld is broken open in a vise or by means of a chisel and hammer and visually inspected. If a good weld is found, the operator uses the same setting for the machine, and he assumes that good welds are subsequently produced on the workpiece. Nondestructive methods such as X-rays or weld expansion measurements have also been used, but these must be interpreted, and they also require expensive equipment. With the method of the present invention the operator merely by inspection of the workpiece can determine whether a satisfactory weld has been made. As best shown in FIGURES 5 and 8 the electron beam penetrates completely through all sheets of material, leaving a bead at the top and at the bottom of the respective sheets. A bead 67 is formed on the surface of the top sheet and a smaller projecting bead 68 is formed on the bottom surface of the underlapped sheet. When the projecting bead 68 is found on the bottom surface of the second sheet or plate the operator knows for sure that the weld has penetrated sufficiently deep for a good and satisfactory joint.

The complete penetration of the parts of the workpiece by the electron beam and the formation of the visible bead 68 on the bottom of the under sheet is obtained by controlling the beam power. The power applied for projecting the beam must be sufficiently high so that the beam penetrates the full depth of the overlapping sheets or plates which are being welded.

In making circular welds it may be desirable to program the welding current so that there is a first period in which the welding current is increased slowly, then a period during which the current remains constant, followed by a tapering down of the current prior to termination or closing of the circle in order that a hole or cavity is not left in the weld. This technique may also be used in making spot welds.

A unit sealing force of fifty thousand pounds per square inch was previously selected as an example in the description relating to the sealing pressure for the dies. This value may vary with the hardness or stiffness of the material to be welded, and also with the thickness of the sheets or parts involved. The degree of their surface finish is still another factor. While circular welds may fulfill the usual requirements, oblong welds 63 as shown in FIGURES 7 and 8 will result in a higher joint efficiency. Also, such welds may be more effective for certain load distributions within the assembly. Likewise special weld perimeters may be desirable in some cases.

In connection with the various methods for sealing the interface between the overlapping workpieces it may be mentioned that the surfaces can be coated with a suitable material or compound capable of being brushed on the mating surfaces to better effect a seal.

A further sealing method is one in which the dies are connected to the secondary of a small welding transformer that can be energized momentarily in order to provide a short pulse of current for softening the material at the interface, and thus in combination with the pressure applied to the dies, provide a good seal.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed is:

1. In an electron beam method of localized welding of overlapping sheets, the steps which consist in clamping the sheets between opposed tubular dies so that each die has surrounding relation with the area to be welded for its particular sheet, applying sufficient pressure to the dies to form annular seals at the dies and at the mating surfaces of the parts, evacuating each tubular die, and then energizing an electron gun to cause the projection of an electron beam through the passageway provided by one of said dies and its impingement on the workpieces to weld the same.

2. In an electron beam method of spot welding overlapping sheets as defined by claim 1, wherein the electron beam projected by the electron gun is caused to move along a definite path during the welding operation.

3. In a method of spot welding overlapping metal sheets by means of an electron beam, the steps which consist in clamping the metal sheets at the overlap and in surrounding relation with the spot to be welded by means of tubular dies, one die having contact with the top sheet, the other die having contact with the bottom sheet and said dies being substantially aligned, applying sufficient pressure to the dies to form annular seals at the mating surfaces of the dies and of the parts, evacuating each tubular die, energizing an electron gun so as to produce a focused electron beam, and projecting the focused electron beam through the passageway provided by one of said dies so that it impinges on the workpieces to weld the same.

4. In a method of spot welding overlapping metal sheets by means of an electron beam as defined by claim 3, additionally including the step of causing the focused electron beam to move along a definite path during the welding operation.

5. In an electron beam method of localized welding of overlapping sheets, the steps which consist in clamping the sheets between opposed tubular dies so that each die has surrounding relation with the area to be welded for its particular sheet, applying sufficient pressure to the dies to form annular seals at the dies and at the mating surfaces of the parts, evacuating each tubular die, energizing an electron gun to cause the projection of an electron beam through the passageway provided by one of said dies and into impingement with the workpieces, and in controlling the electrical power supplied by the gun in projecting the beam so that the fused material of the weld extends completely through all the sheets of the workpiece and forms a visible but relatively small projecting bead on the bottom surface of the underlapped sheet.

6. In an electron beam method of localized welding of overlapping sheets as defined by claim 5, wherein the electron beam projected by the electron gun is caused to move in a definite path during the welding operation.

7. In an electron beam method of localized welding of overlapping sheets, the steps which consist in conditioning the interface between the overlapping sheets in the area to be clamped by the dies in order to facilitate the sealing at the interface, clamping the sheets between opposed tubular dies so that each die has surrounding relation with the area to be welded for the particular sheet, applying sufficient pressure to the dies to form annular seals at the dies and at the interface of the mating surfaces of the parts, evacuating each tubular die, energizing an electron gun to cause the projection of electron beams through the passageway provided by one of said dies and into impingement with the workpieces, and in controlling the electrical power supplied by the gun in projecting the beam to weld the workpieces in a satisfactory manner.

References Cited

UNITED STATES PATENTS

| | | | |
|---|---|---|---|
| 3,016,449 | 1/1962 | Steigerwald | 219—117 |
| 3,136,882 | 6/1964 | Radtke | 219—121 |
| 3,136,883 | 6/1964 | Radtke | 219—121 |
| 3,174,026 | 3/1965 | Bowers et al. | 219—117 |
| 3,187,216 | 6/1965 | Sciaky. | |
| 3,219,792 | 11/1965 | Pederson | 219—121 |
| 3,258,576 | 6/1966 | Schleich et al. | 219—121 |
| 3,264,004 | 8/1966 | Sciaky | 219—121 |
| 3,301,993 | 1/1967 | Boyd et al. | 219—121 |

FOREIGN PATENTS 634,718   11/1963   Belgium.

RICHARD M. WOOD, *Primary Examiner.*

W. D. BROOKS, *Assistant Examiner.*

U.S. Cl. X.R.

219—127, 89